INVENTOR.
DAVID FELT
BY Darby & Darby
ATTORNEYS

Oct. 28, 1952 D. FELT 2,615,420

TELEVISION TUNING INDICATOR

Filed June 17, 1950 3 Sheets-Sheet 2

INVENTOR.
DAVID FELT

BY Darby & Darby

ATTORNEYS

Oct. 28, 1952 D. FELT 2,615,420

TELEVISION TUNING INDICATOR

Filed June 17, 1950 3 Sheets-Sheet 3

INVENTOR.
DAVID FELT

BY Daly & Daly

ATTORNEYS

Patented Oct. 28, 1952

2,615,420

UNITED STATES PATENT OFFICE 2,615,420

TELEVISION TUNING INDICATOR

David Felt, Teaneck, N. J., assignor to Allen B. Du Mont Laboratories, Inc., Clifton, N. J., a corporation of Delaware Application June 17, 1950, Serial No. 168,808

13 Claims. (Cl. 116—124.4)

This invention relates to tuning indicating apparatus and the like and particularly to tuning apparatus adapted for use in a television receiver.

Certain television receivers employ tuning devices continuously tunable from approximately 54 to 216 megacycles per second. These receivers have the advantage that they cover, in a single range, five lower frequency television bands ranging between 54 and 88 megacycles per second, a frequency modulation band between 88 and 108 megacycles per second, and seven upper television channels between 174 and 216 megacycles per second. Because of their wide tunable range these receivers do not require front end switching, and hence enjoy certain advantages in performance, such as exceptional freedom from frequency drift with tuning, stability of gain and freedom from internal noise.

However, in order to achieve reasonable spacing on the face of the indicator between adjacent frequencies, these tuners have utilized long scales, have been in a U-shaped form, as described in copending application 721,634 of Paul Ware and Herbert Bernard, or in the form of a spiral, as described in copending application 109,833 of Paul Ware, both assigned to this applicant's assignee.

It is an object of the present invention to achieve reasonable spacing between adjacent frequencies in a tuning indicator having a short length of indicator scale.

It is another object to provide a dial indicating mechanism in which certain portions of the indicating scale are expanded and other portions compressed.

It is a further object to provide an indicating mechanism particularly adapted for use with a tuner covering in a single continuous band the low and high television bands and also the frequency modulation bands.

It is another object to provide an indicating mechanism which retains the accuracy of its indications through changes in relative humidity.

It is a further object to provide an indicating device which is compact, reliable, practical and inexpensive, particularly adaptable to the needs of mass manufacture of high quality television receivers.

In accordance with my invention certain regions of the timing dial indicating scale which heretofore have been relatively cramped, such as the frequency modulation band and the high television band, are expanded, another portion of the scale, the low television band, which heretofore has been relatively expansive, has been compressed, and another portion of the spectrum, between 108 and 174 megacycles, containing aviation, amateur and telephone services, has been compressed. The tuning device is linked to the indicating device through a variable speed linkage in which one or more idler pulleys operating differentially upon a pulley drive mechanism are mounted upon a rocker arm actuated by a cam.

Figure 1:
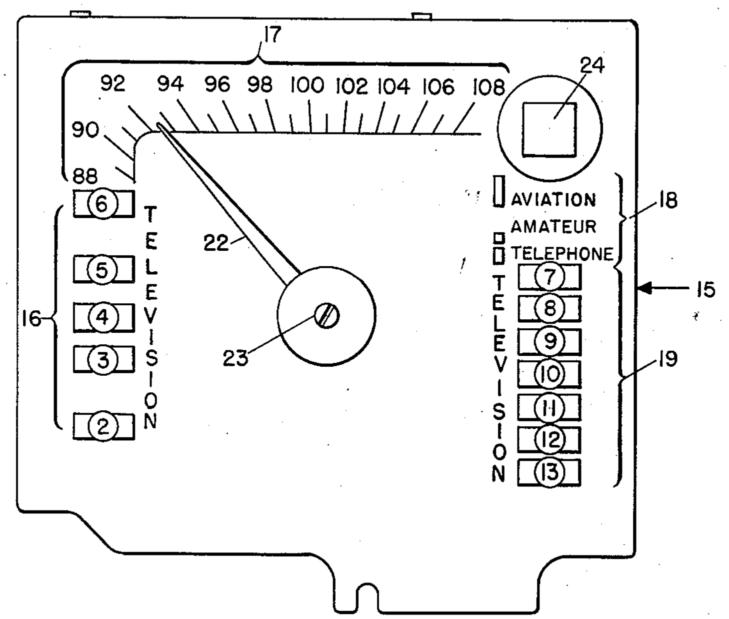
Figure 1 is a front elevation of a dial face embodying my invention.

Referring to Figure 1, a frequency dial face 15 of a television and frequency modulation receiver has formed upon it an indicating scale in three portions, one portion being a series 16 of small numbers 2 through 6 in a vertical scale representing the lower television channels having sound carrier frequencies of 59.75, 65.75, 71.75, 81.75 and 87.75 megacycles, respectively. A second portion of the scale is a series 17 of numbers arranged horizontally representing frequency modulation stations having carrier frequencies between 88 and 108 megacycles. A third portion 18 of the scale has the special aviation, amateur and telephone allocations between 108 and 174 megacycles, and a fourth portion has a series 19 of numbers representing the upper television channels 7 through 13 having sound carrier frequencies of 179.75, 185.75, 191.75, 197.75, 203.75, 209.75 and 215.75 megacycles respectively. An indicator or pointer 22 which is affixed to a hub 23 rotatably mounted in the dial face 15 points out upon the portions 16, 17, 18 and 19 of the indicating scale the frequency to which the receiver is tuned. An opening 24 in the dial face 15 permits the use of an electric eye tube of conventional form to show by the presence of the received signal the degree of precision of tuning.

Figure 2:
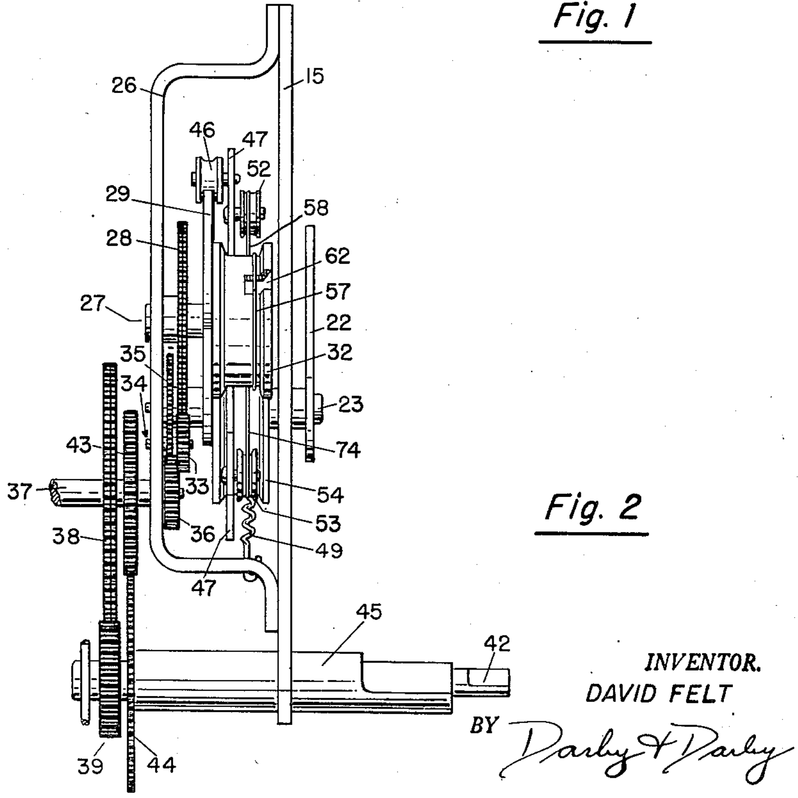
Figure 2 is a side view of the same embodiment.
Figure 3:
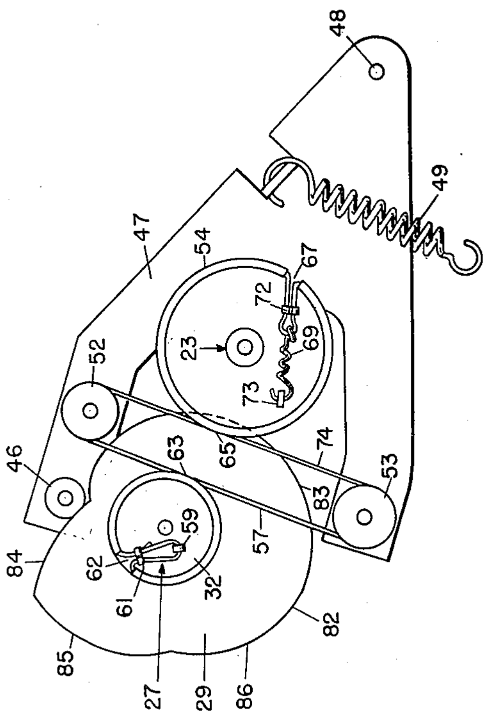
Figure 3 is a diagrammatic view of the mechanism of the same embodiment.

The mechanism of the tuning device can be seen by referring to Figure 2, which shows a side view of the device, in conjunction with the diagrammatic view of Figure 3.

The dial face 15 is attached rigidly to a frame 26. Attached rotatably to a stud on the frame 26 is a drive assembly 27 including a spur gear 28, a circular cam 29 and a drive pulley 32.

The spur gear 28 is geared to a tuning device in the electrical circuit, not shown, the coupling between the spur gear 28 and the tuning device being linear, which is to say a certain fraction of a turn in rotation of the tuning mechanism in all cases results in another certain fraction of a turn of the spur gear 28, for all possible positions of the two.

In a preferred embodiment, the device tunes continuously for a sound carrier between 58 and 217.5 megacycles per second and a picture carrier between 53.5 and 213 megacycles, the tuning shaft making 7.6 revolutions in so doing, and the drive assembly 27 making fewer than one revolution.

Thus the spur gear 28 is provided with sixty teeth engaging a pinion 33 having fifteen teeth on an idler assembly 34 rotatably mounted on a stud. A spur gear 35, having thirty-two teeth on the idler assembly 34 engages a pinion 36, having sixteen teeth, on the tuning shaft 37. The tuning shaft 37 has a spur gear 38, with one hundred twenty teeth, engaging a pinion 39, with thirty-two teeth, on a knob drive assembly 42 rotatably mounted and provided with a knob for fine manual tuning. A second pinion 43, having fifty-six teeth, on the tuning shaft 37 engages a spur gear 44, with ninety-six teeth, on a tuning sleeve 45 coaxial with the tuning shaft 42 and rotatable with respect thereto. The sleeve 45 is fitted with a knob for coarse manual tuning. The above gear trains are of a type and operate in a manner known in the art. In a manner also known, the spur gears 28 and 35 mentioned above are preferably split and provided with scissor springs to minimize back lash.

The knob for manual tuning is, as described in this embodiment, preferably geared to the tuning shaft 37 rather than attached rigidly thereto. This prevents damage to the tuning mechanism from accidental bumps against the tuning knob.

The circular cam 29, which can be staked securely to the drive assembly 27 but preferably can be rotated after assembly and then tightened in place to permit accurate dial tracking, engages a cam follower 46 rotatably mounted on a movable platform which in the preferred embodiment is a rocker arm 47 rotatable about a fixed pivot 48. The cam 29 and follower 46 in combination form a non-linear coupling between the drive assembly 27 and the rocker arm 47, a rocker arm spring 49 maintaining contact therebetween.

Two idler pulleys 52 and 53 are also rotatably mounted on the rocker arm 47. A driven pulley 54 is rigidly attached to a hub 23 rotatably attached to a stub affixed to the frame 26. The direct connection between the hub 23 and the indicator 22 is a simple form of linear coupling, this coupling having the characteristic that a certain amount of rotation always results in another certain amount of rotation of the indicating pointer 22 in all possible positions of each.

A dial cord 57, used as a flexible non-stretchable transmission, having a first portion 58, has an end attached by means of a clamp 61 to a cleat 59 formed in the face of the driving pulley 32. The cord 57 extends through an eyelet 62 and around the periphery of the pulley 32 in a counterclockwise direction to a tangential point 63 where the portion 58 of the cord 57 leaves the drive pulley 32 to engage the idler pulley 52, extends around this pulley 52 approximately 180° and returns in the opposite direction to engage the driven pulley 54 at a second tangential point 65. The cord portion 58 then extends in a counterclockwise direction around the periphery of the driven pulley 54 extending through a slot 67 in this pulley to engage a dial cord spring 69 to which it is fastened by means of a clamp 72, the other end of the spring 69 being affixed to a cleat 73 in the driven pulley 54.

A second portion 74 of the cord 57 clamped to the spring 69, extends through the slot 67, bears counterclockwise around the periphery of the driven pulley 54 to the second tangential point 65 whence it leaves the driven pulley 54 to engage the second idler pulley 53, extending around this approximately 180° and returning oppositely to the driving pulley 32 engaging this at the tangent point 63, extending around the periphery of the driving pulley 32 to the eyelet 62, and extending through this to terminate at the clamp 61.

Figure 4:
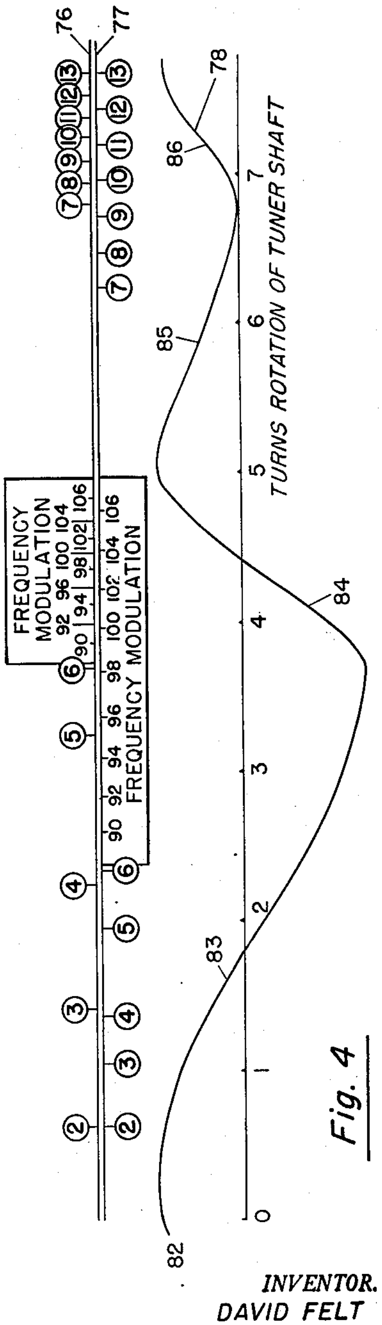
Figure 4 is a curve relating the continuous tuning device to the indicating scale in my preferred embodiment.

The action of this embodiment can be best understood by referring to Figure 4. In this figure a top scale 76 shows the distribution of frequencies that would occur in a scale if a tuner of the type described were connected linearly to an indicating scale. It will be seen that the lower television channels 2—5 are widely spread out and that nearly one quarter of the scale is devoted to the region of the spectrum between 108 megacycles and television channel 7, which is used only for the special services.

A lower scale 77 placed adjacent to 76 for comparison shows a more desirable distribution. Here the lower television band has been compressed from almost one half to less than one third of the total length of scale, the F. M. band has been expanded from one sixth to over one third, the special services portion has been compressed from one quarter to approximately one sixth the total, and the upper television band has been expanded from one eighth to approximately one fifth the total.

In the lower part of Figure 4 is plotted the correction curve 78 necessary to obtain the desired distribution 77 from the undesired distribution 76. This curve 78 is used to determine the shape of the circular cam 29. Referring to Figure 3, when the receiver is tuned to its lowest frequency position, corresponding to a zero turn of the tuner shaft 37 (Figure 4), the drive assembly 27 and cam 29 are in their extreme counterclockwise position, the cam follower 46 engaging a point 82 of the cam 29. As the tuning shaft is turned, increasing the received frequency, the cam revolves in a clockwise direction, and a negative slope portion 83 of the cam engages the cam follower 46, allowing the rocker arm 47 to descend, actuated by the rocker arm spring 49. This reduces the length of the first portion 58 of the cord 57 between the first idler pulley 52 and the tangential points 63 and 65 and increases the second portion 74 a corresponding amount, whereby the sum of the two portions remains substantially the same, retarding the motion of the driven pulley 54 and compressing the indicating scale of the lower television channels 2 to 6 as shown in the preferred distribution 77.

As the receiver continues to be tuned in the same direction, the cam follower engages a positive slope region 84 of the cam. This causes the rocker arm 47 to be raised, increasing the length of the cord 57 between the tangential points 63 and 65 engaging the first idler pulley 52 and decreasing a corresponding amount the length of the cord 57 between the tangential points 65 and 63 engaging the second idler pulley 38, increasing the motion of the driven pulley 54 and expanding the scale 77 in the region of F. M. reception, 88 to 108 megacycles. The cam 29 and pointer 22 are shown in Figures 1, 2 and 3 positioned in this region.

Continuing further, the cam follower 46 engages next a second negative slope region 85 decreasing the special services portion of the spectrum, and finally a second positive slope region 86, expanding the upper television band.

One of the features of this embodiment is that the segments 58 and 74 of the cord 57 and from the eyelet 62 to the spring 69 are equal in length whereby changes in length of these two portions of the cord 57 caused by changes in relative humidity are taken up equally by the spring 69 preventing any error of indication.

Another feature of this embodiment lies in the relative positions of the axes of the driving assembly 27, the driven hub 23 and the rocker arm pivot 48, these axes being situated in substantially a straight line. This construction permits free action of the cam 29 over the entire tuning range without any substantial change in the lengths of string over the two paths between the eyelet and the spring so that the spring is able to maintain constant tension over the tuning range.

A further feature of the invention is its adaptability, in that a large band of frequencies is continuously receivable, but that certain smaller bands within the large band are spread or expanded.

In the described case the frequency modulation and upper television bands are so expanded. However, by a change in only the contours of the circular cam 29, a multiplicity of spread bands can be obtained in any desired portions of the larger band. This means that the economies of mass production can be applied to the entire structure, and by a mere change of cam the distribution of frequencies in the dial can be changed for different receiver models. The cam itself is readily adaptable in shape for this purpose, being made of a single piece of flat metal stock adaptable to punching.

Figure 5:
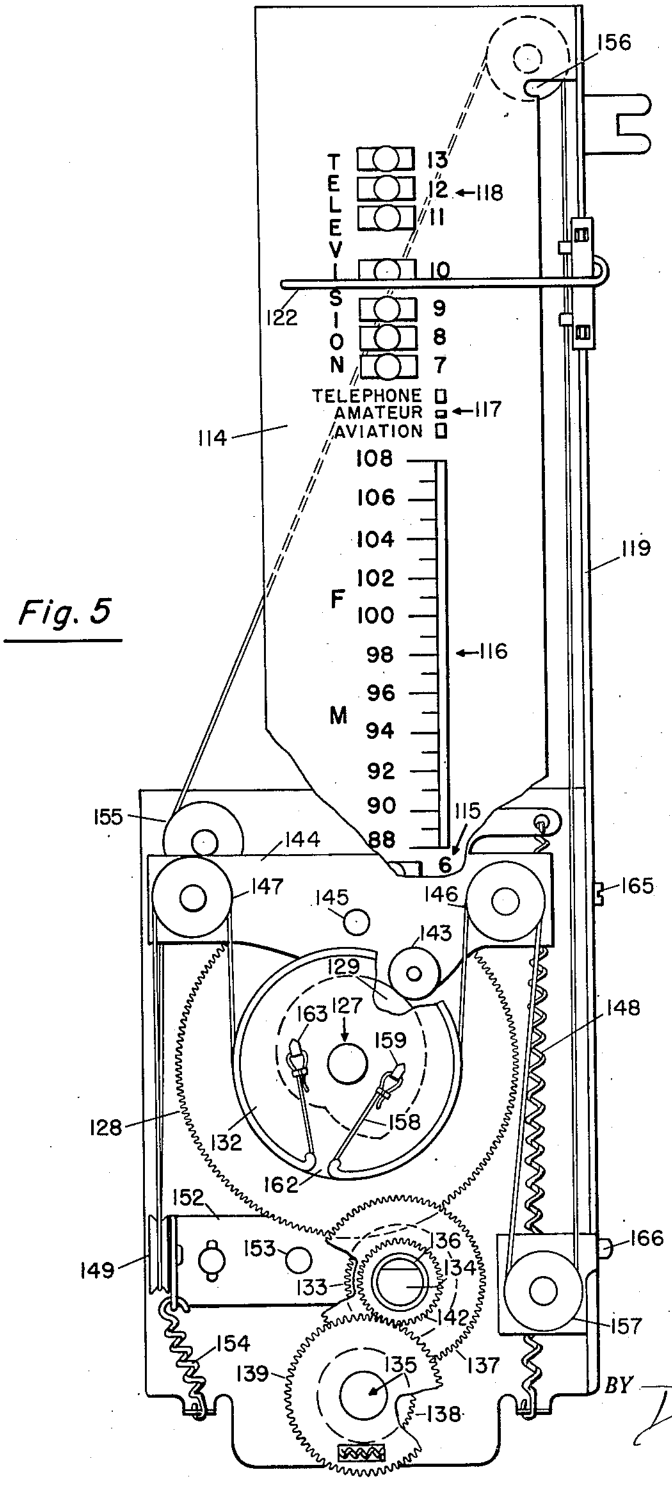
Figure 5 shows an alternative embodiment of my invention.

Referring to the second embodiment shown in Figure 5 a dial face 114 with the bottom end thereof cut away contains in a single vertical scale the lower television channel numbers 115, of which only channel 6 is shown, a frequency modulation scale 116, a special service band 117, and upper television channel numbers 118. Rigidly attached to the dial face 114 is a track 119 for a sliding pointer 122.

The mechanism for actuating the pointer 122 comprises a rotatable drive assembly shaft 127 having rigidly affixed to it a spur gear 128, a circular cam 129 shown in dotted lines, and a driving pulley 132. The spur gear 128 in this embodiment has one hundred twenty-nine teeth and engages a pinion 133 directly mounted on a tuner shaft 134, the pinion having thirty-two teeth. The tuner shaft is provided with a flattened end shaped to receive a knob for manual operation and also has a vernier tuning portion comprising a rotatable idler assembly 135 and a vernier sleeve 136 coaxial with the tuning shaft 134. A sixty tooth spur gear 137 affixed to the tuning shaft engages a thirty-two tooth pinion 138 of the idler shaft 135. Another sixty tooth spur gear 139 of the idler assembly 135 engages a thirty-two tooth pinion 142 on the vernier sleeve 136.

A cam follower 143 rotatably mounted on a rocker arm 144 engages the cam 129. The rocker arm 144 is rotatably mounted on a pivot 145. Rotatable idler pulleys 146 and 147 are mounted on the rocker arm 144 and a spring 148 holds the camp follower 143 in engagement with the cam 129.

A third idler pulley 149 is mounted on a bracket 152 rotatable about a pivot 153 being urged in a downward direction by a spring 154. Three more idler pulleys 155, 156, 157 are attached to various parts of the frame.

In the position shown in which the tuning mechanism is tuned between channels 9 and 10 of the upper television band, the dial cord 158 has one end attached to a cleat 159 on the driving pulley 132. The cord 158 extends from this cleat 159, through a slot 162 in and around the periphery of the driving pulley 132, around the idler pulleys 146 and 157 to engage the pointer 122. Continuing from the pointer 122 the cord 158 passes around the idler pulleys 156, 155, 149 and 147, in that order, passes around the periphery of the driving pulley 132 in this tuning position approximately one and one quarter turns, extends back through the slot 162, and terminates in a second cleat 163 in the driving pulley 132.

One of the features of this embodiment is that, in tuning over the entire frequency range from 54 to 216 megacycles which requires approximately six turns of the tuning shaft, the cam shaft makes a total of approximately one and one half turns. This enables the drive assembly 127 and the tuner shaft 137 to be directly geared to one another without requiring either an idler shaft in between which would cause greater backlash, or requiring a larger spur gear than the 129 tooth gear 128, which gear if larger, would prevent the presently attained compactness of this unit. Certain portions of the cam therefore are used to provide the proper compression and expansion curve both at frequencies below channel 4 and frequencies above channel 7.

Another feature of this embodiment lies in an adjusting screw 165 whereby the certain portions of the indicator comprising the indicator scale, the track 119, the pointer 122, and the idler wheel 156 are adjustable with respect to the rest of the apparatus about a pivot point 166 provided by a rivet.

The tuning shaft 134 is in general attached to a television chassis mounted in a cabinet. Unavoidable variations in cabinets make it desirable that the dial face 114 be adjustable over a small range with respect to the tuning shaft 132 and the television receiver chassis. In accordance with this embodiment the pivot 166 about which the adjustment is made is placed at a point close to the position of the idler pulley 157, this portion of the cord 158 extending between the pulley 132 and the indicating pointer 122 being preferably shorter than the other portion which engages the spring biased idler pulley 149. This enables the adjustment to be made after the chassis is placed in the cabinet.

Although certain features and embodiments of my invention have been described and shown, the scope of my invention is indicated by the following claims.

What is claimed is:

1. A radio and television tuning indicating assembly comprising a driving member linearly coupled to actuate a tuning device, a driven member coupled to be actuated by said driving member and linearly coupled to actuate an indicator, a movable platform having one point thereof mounted in fixed relationship to said driving member, an idler pulley attached to said platform, a flexible transmission member linking said driving and driven members and said pulley, and a non-linear coupling between said platform and said driving member whereby said platform is rotated about said fixed point thereof in predetermined accordance with the position of said driving member and said indicator is caused to indicate in a predetermined non-linear relationship with respect to said tuning device.

2. An indicating assembly comprising a driving member having a driving pulley, a driven member coupled thereto and to an indicator, a movable platform having one point thereof mounted in fixed relationship to said driving member, an idler pulley attached to said platform, a flexible transmission member engaging said driving pulley and linking said driving and driven members and said idler pulley, and a non-linear coupling between said platform and one of said driving and driven members whereby said platform is rotated about said fixed point thereof in predetermined accordance with the position of at least one of said driving and driven members, and said driven member is caused to move in a predetermined non-linear relationship with respect to said driving member.

3. An indicating assembly comprising a driving member, a driven member coupled thereto and to an indicator, a rocker arm rotatable about a pivot having fixed relationship to said driving and driven members, an idler pulley rotatably affixed to said arm, a flexible transmission member linking said driving and driven members and said pulley, and a non-linear coupling between said rocker arm and one of said members whereby said rocker arm is rotated about said pivot in predetermined accordance with the position of at least one of said driving and driven members.

4. An indicating assembly in accordance with claim 3 in which the non-linear coupling is a cam mechanism engaging and coupling said rocker arm and one of said members.

5. An indicating assembly comprising a rotatable driving member having a driving pulley and a cam driven by said member, a driven member coupled to an indicator, a movable platform having an idler pulley attached thereto and having a cam follower attached thereto and engaging said cam, and a flexible transmission member linking said driving and driven members and said pulley.

6. An indicating assembly comprising a driving pulley and a generally circular cam linearly coupled to a tuning device, an indicator connected to be actuated by said tuning device, a movable assembly having an idler pulley, attached thereto, means to move said movable assembly in accordance with said cam, and a flexible transmission member linking said driving and idler pulleys and said indicator.

7. An indicating unit comprising a driving pulley, a rocker arm assembly rotatable about a pivot in said unit, a pair of idler pulleys mounted on said rocker arm assembly, said idler pulleys being located on opposite sides of a line drawn between said pivot and the axis of rotation of said driving pulley, an indicator scale drive, means, and a flexible transmission member linking said driving pulley, said pair of idler pulleys, and said indicator scale drive means.

8. An indicating unit comprising a driving pulley, an indicator means, a movable assembly supporting first and second idler pulleys, a cam mechanism coupled to be actuated by said driving pulley and engaging said movable assembly to move said assembly in accordance with movement of said driving pulley, a first flexible transmission member affixed to said driving pulley and to said indicator means and extending approximately 180 degrees around and in contact with the periphery of said first idler pulley, and a second flexible transmission member affixed to said driving pulley and to said indicator means and extending oppositely from said first flexible member therefrom and extending approximately 180 degrees around and in contact with the periphery of said second idler pulley.

9. An indicating assembly comprising a driving pulley, an indicator means, a movable assembly supporting first and second idler pulleys, a cam mechanism coupled to be actuated by said driving pulley and engaging said movable assembly to move said assembly in accordance with movement of said driving pulley, a first flexible transmission member affixed to said driving pulley and to said indicator means and extending around and engaging a portion of the periphery of said first idler pulley, and a second flexible transmission member equal in length to said first flexible member affixed to said driving pulley and to said indicator means and extending oppositely from said first member and extending around and in contact with the periphery of a portion of said second idler pulley.

10. Tuning indicator apparatus for a receiver of electromagnetic waves containing means for receiving a larger band of frequencies continuously receivable and a smaller spread band of frequencies within said larger band, a tuning device, an indicating device, and a cam mechanism linking said tuning and indicating devices and containing on the surface thereof within the corresponding operative range of said larger band a negative slope region and a positive slope region, said negative and positive slope regions corresponding in tuning position with said smaller spread band of frequencies.

11. In an indicating assembly, a first idler pulley, a second idler pulley, a movable assembly supporting said first and second idler pulleys, a third pulley having an opening on the periphery thereof, a fourth pulley, a cam mechanism engaging said movable assembly with one of said third and fourth pulleys, a spring attached to said third pulley, a first flexible transmission member affixed to said fourth pulley and extending around said first idler pulley and passing through said opening in said third pulley and connected to an end of said spring, and a second flexible transmission member approximately equal in length to said first member affixed to said fourth pulley and extending around said second idler pulley and passing through said opening in said third pulley and connected to an end of said spring.

12. The indicating assembly in accordance with claim 5, in which said driven member comprises a rotatable member attached to said flexible transmission member to be rotated thereby, and a dial pointer connected to be rotated by said rotatable member.

13. The indicating assembly in accordance with claim 5, in which said driven member comprises a dial pointer positioned to be slidable along a fixed path and connected to said flexible transmission member.

DAVID FELT.

REFERENCES CITED

The following references are of record in the file of this patent:

UNITED STATES PATENTS

| Number | Name | Date |
|---|---|---|
| 1,670,782 | Pfanstiehl | May 22, 1928 |
| 1,689,602 | Sanford | Oct. 30, 1928 |
| 2,103,856 | Liessmann | Dec. 28, 1937 |